(12) United States Patent
Tsai et al.

(10) Patent No.: US 7,138,782 B2
(45) Date of Patent: Nov. 21, 2006

(54) MOTOR CONTROL SYSTEM AND METHOD OF THE SAME

(75) Inventors: Chao-Lung Tsai, Hsin-Chu (TW); Chang-Long Wu, Yi-Lan (TW)

(73) Assignee: Mediatek, Incorporated, Hsin-Chu (TW)

( * ) Notice: Subject to any disclaimer, the term of this patent is extended or adjusted under 35 U.S.C. 154(b) by 42 days.

(21) Appl. No.: 11/033,771

(22) Filed: Jan. 12, 2005

(65) Prior Publication Data
US 2005/0206338 A1 Sep. 22, 2005

(30) Foreign Application Priority Data
Mar. 17, 2004 (TW) .................. 93107183

(51) Int. Cl.
*G05D 23/275* (2006.01)
(52) U.S. Cl. ............... 318/632; 318/650; 318/652; 318/653; 318/654; 318/655
(58) Field of Classification Search ........... 318/432, 318/434, 632–655
See application file for complete search history.

(56) References Cited

U.S. PATENT DOCUMENTS

| | | | | |
|---|---|---|---|---|
| 4,371,818 A | * | 2/1983 | Lewis | 318/254 |
| 4,748,393 A | * | 5/1988 | Fincher et al. | 318/638 |
| 4,839,754 A | * | 6/1989 | Gami et al. | 360/73.01 |
| 5,086,421 A | | 2/1992 | Tateishi | |
| 5,159,503 A | * | 10/1992 | Mitamura et al. | 360/73.02 |
| 5,170,386 A | | 12/1992 | Tateishi | |
| 5,402,400 A | * | 3/1995 | Hamada et al. | 360/78.06 |
| 5,646,492 A | * | 7/1997 | Nagano et al. | 318/432 |
| 5,774,299 A | * | 6/1998 | Baum et al. | 360/77.08 |
| 5,982,728 A | * | 11/1999 | Okamoto et al. | 369/47.4 |
| 6,069,854 A | | 5/2000 | Koudo et al. | |
| 6,257,515 B1 | * | 7/2001 | Fukuda et al. | 242/333.7 |
| 6,259,662 B1 | | 7/2001 | Matsui et al. | |
| 6,459,665 B1 | * | 10/2002 | Chu | 369/44.35 |
| 6,646,824 B1 | * | 11/2003 | Takaishi et al. | 360/77.02 |
| 6,768,705 B1 | * | 7/2004 | Hirai | 369/44.28 |

\* cited by examiner

*Primary Examiner*—Rina Duda
*Assistant Examiner*—Tyrone Smith
(74) *Attorney, Agent, or Firm*—Hoffman, Warnick & D'Alessandro LLC

(57) ABSTRACT

The present invention provides a motor control system and method thereof. The motor control system comprises a motor controller and a compensation device. The motor controller is used for generating a motor control output according to a reference signal and a first signal. The compensation device is used for generating a compensated motor control output according to the motor control output and a second signal. Moreover, the compensation device utilizes the compensated motor control output to reduce the steady-state phase error between the first signal and the reference signal.

19 Claims, 14 Drawing Sheets

MOTOR CONTROL SYSTEM AND METHOD OF THE SAME

BACKGROUND OF THE INVENTION

1. Field of the Invention

The present invention relates to a motor control system and method thereof, especially to a motor control system and method thereof for reducing the steady-state phase error and the transition time.

2. Description of the Prior Art

Please refer to FIG. 1(a), FIG. 1(b), and FIG. 1(c). FIG. 1(a) is a schematic diagram of a motor system 10 of the prior art. FIG. 1(b) is a schematic diagram of a motor controller 30 of the prior art. FIG. 1(c) is a schematic diagram of a transfer function of the motor controller 30 of the prior art. The motor system 10 of the prior art usually comprises a motor device 12, a motor controller 30, a pulse width modulation (PWM) generator 26, and a resistance-capacitance (RC) filter 28. The motor controller 30 is used for controlling the motor device 12. As shown in FIG. 1(b), the motor controller 30 comprises a frequency detector 11 and a phase detector 13. The frequency detector 11 is used for detecting the frequency error between a first feedback signal 44 and a reference clock signal 42. The phase detector 13 is used for detecting the phase error between the first feedback signal 44 and the reference clock signal 42. Furthermore, the motor controller 30 utilizes the frequency gain (Gf), the phase gain (Gp), and the sum gain (Gs) to adjust the frequency detector 11, the phase detector 13, and the sum result thereof, so as to determine the motor control output 31 and control the motor device 12 to achieve ideal predetermined frequency and phase. The schematic diagram of the transfer function of the motor controller 30 is shown in FIG. 1(c), i.e.

$$G_s \cdot \left( \frac{S \cdot K_{FD} \cdot G_f + K_{PD} \cdot G_p}{S} \right),$$

wherein S is a Laplace variable of the signal frequency, $K_{FD}$ and $K_{PD}$ represent the gain of the frequency detector 11 and the phase detector 13 respectively, and Gf, Gp, and Gs are the programmable gain for adjusting the frequency detector 11, the phase detector 13, and the sum result thereof respectively. Although the motor system 10 has accurate frequency in steady state, there are still errors in the phase. The errors in the phase will affect the control manner of a device utilizing the motor system 10. For example, if the device utilizing the motor system 10 is an optical information recording/reproducing system, e.g. a CD-ROM drive, the CD-ROM drive will be affected by different control manners of the motor system, e.g. constant angular velocity (CAV) or constant linear velocity (CLV).

Please refer to FIG. 2(a) to FIG. 2(d). FIG. 2(a) is a schematic diagram of the radius (r) and the angular speed (rpm) of the CAV motor. FIG. 2(b) is a schematic diagram of the radius (r) and the angular speed (rpm) of the CLV motor. FIG. 2(c) is a schematic diagram of the radius (r) and the control voltage (Vm) of the CAV motor. FIG. 2(d) is a schematic diagram of the radius (r) and the control voltage (Vm) of the CLV motor. Under the CAV mode, the phase error is fixed because the inner and the outer angular speeds of the disc are the same even though the radii are different, so that the control of the motor is not being affected a lot. However, under the CLV mode, the phase error is different because the inner and the outer angular speeds of the disc are different by different radii, so that Gp and Gs should be adjusted to achieve better quality control. Moreover, before the motor system 10 of the prior art reaches the predetermined ideal angular speed and phase, it needs a period of time for the angular speed and the phase of the motor device 12 to reach the predetermined ideal value. This period of time is called transition time.

The motor controller 30 in the motor system 10 of the prior art needs a longer transition time for the frequency and the phase of the motor device 12 to converge to the predetermined ideal value. Moreover, even if the motor device 12 reaches the steady state and has the accurate frequency, there are usually still errors in the phase. In devices which request more accurate phase, this kind of the motor device 12 does not conform to the standard and causes problems in some devices. According to the above description, the motor system 10 of the prior art in steady state has some problems, e.g. larger phase error and longer transition time, to be improved.

SUMMARY OF THE INVENTION

The objective of the present invention is to provide a motor control system for reducing the steady-state phase error of a motor device, so that the motor device can work under more ideal predetermined phase, and the transition time is reduced, so as to reach steady state quickly. The present invention provides a motor control system for controlling a motor device to achieve the functions of reducing steady-state phase error and transition time. The motor control system of the present invention comprises a motor controller and a compensating device. The motor controller, the compensating device, and the motor device are situated on a first feedback path, so that the motor device is controlled in the feedback manner. The motor controller is used for generating a motor control output to the compensating device according to a reference signal and a first signal fed back from the motor device. The compensating device comprises a low pass filter (LPF), a compensating offset generator, and an adder. The above three are situated on a second feedback path. The second signal generated by the compensating offset generator compensates the motor control output received by the compensating device via the second feedback path, so as to obtain a corresponding compensated motor control output.

In the compensating device, the LPF is used for averaging and filtering the received motor control outputs sequentially, so as to obtain a corresponding estimated DC value. The compensating offset generator is used for receiving an initial compensating offset and the estimated DC value generated by the LPF and for sequentially generating a corresponding estimated compensating offset to be the second signal for compensating the motor control output according to the received estimated DC value, so as to obtain a corresponding compensated motor control output. The adder is used for adding up the motor control output outputted by the motor controller and the estimated compensating offset, generated by the LPF, sequentially to output the corresponding compensated motor control output for further controlling the angular speed and the phase of the motor device, so as to achieve the predetermined ideal value.

The motor control system of the present invention utilizes the second signal generated via the second feedback path in the compensating device for estimating and compensating the motor control output to reduce the steady-state phase error. While improving the operation in steady state, the present invention utilizes appropriate initial compensating offset and adaptive manner for gradually adjusting the second signal, so that the transition time is reduced, and the problem that the motor system of the prior art needs longer time to reach steady state is improved.

The advantage and spirit of the invention may be understood by the following recitations together with the appended drawings.

BRIEF DESCRIPTION OF THE APPENDED DRAWINGS

DETAILED DESCRIPTION OF THE INVENTION

The present invention provides a motor control system for controlling a motor device to achieve the functions of reducing steady-state phase error and transition time.

Figure 1A:
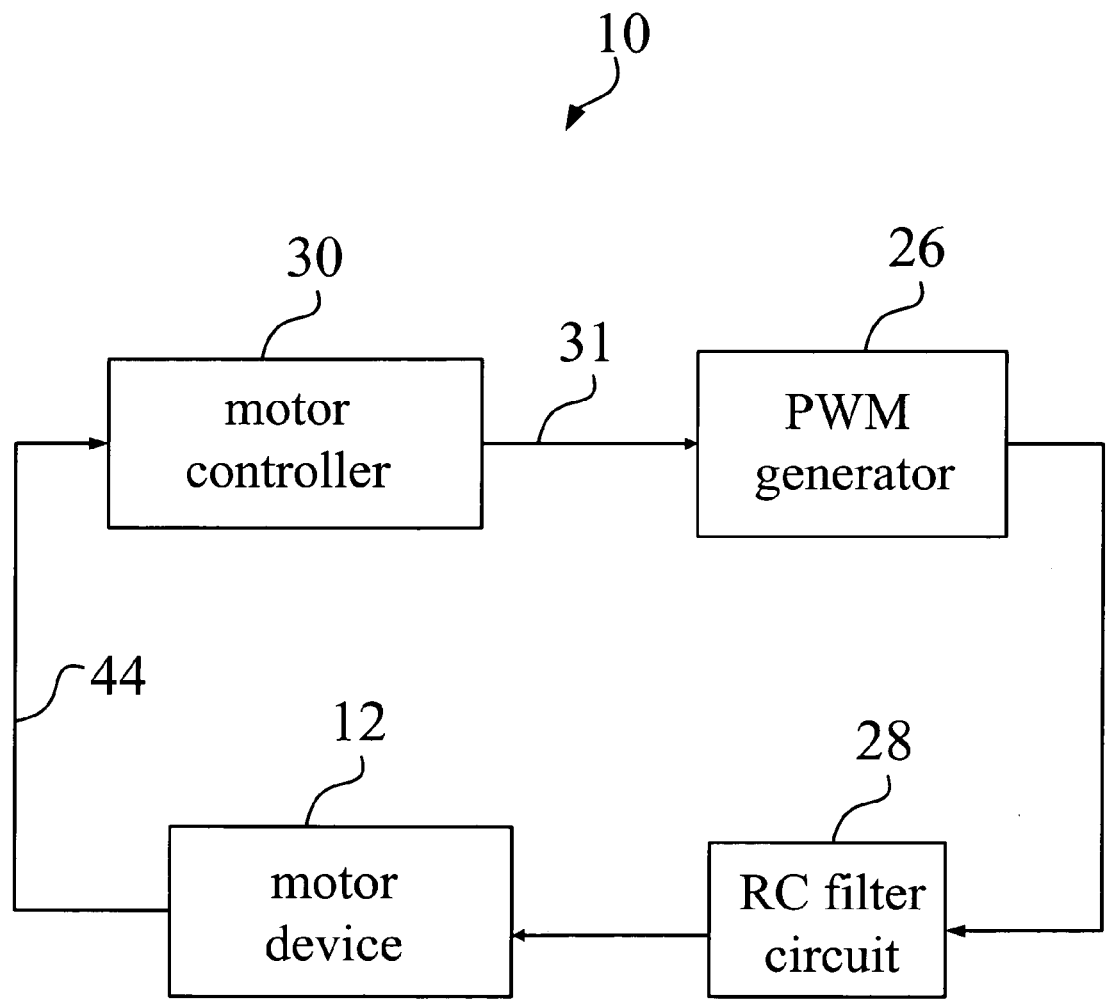
FIG. 1(a) shows a schematic diagram of a motor system of the prior art.
Figure 1B:
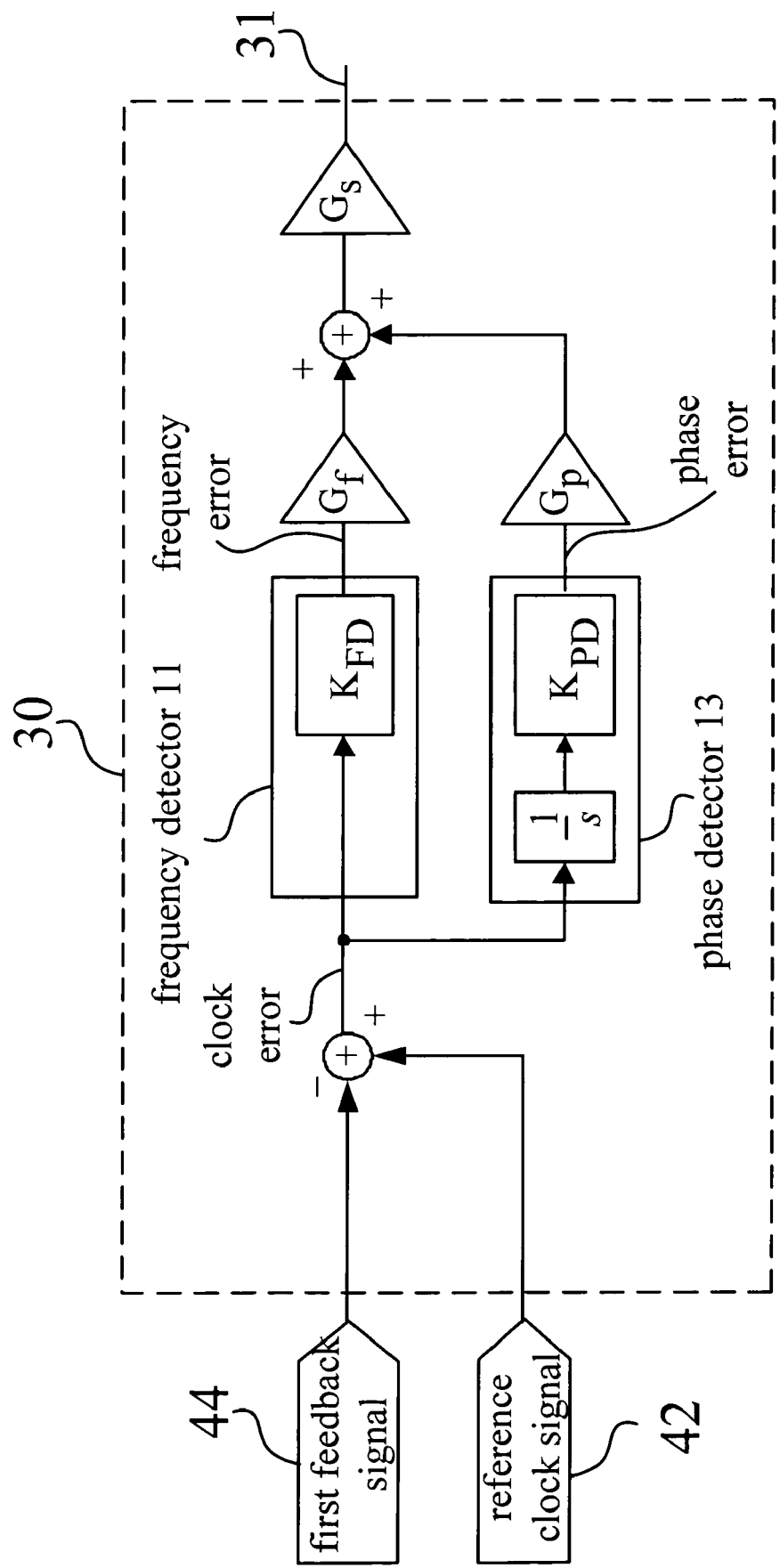
FIG. 1(b) shows a schematic diagram of a motor controller of the prior art.
Figure 1C:
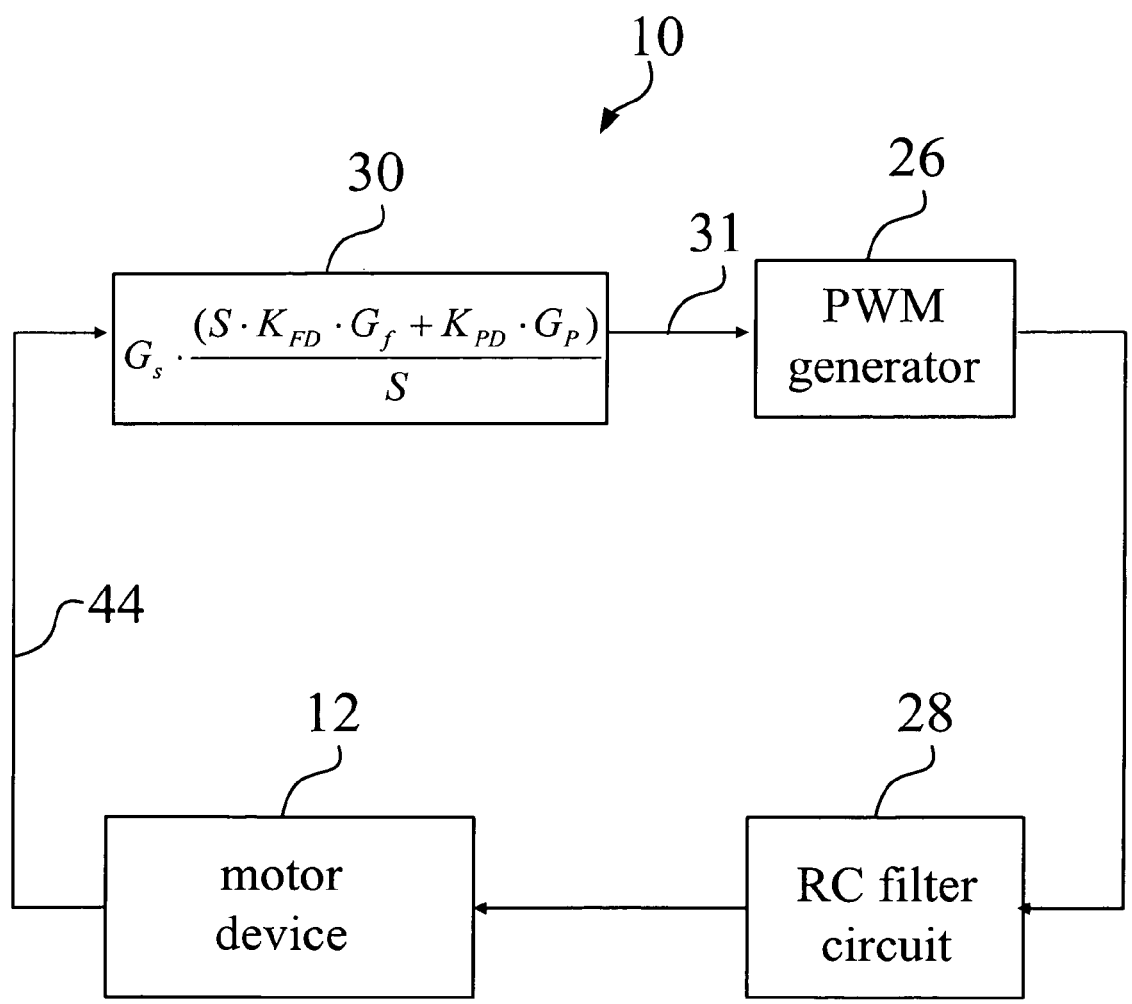
FIG. 1(c) shows a schematic diagram of a transfer function of the motor controller of the prior art.
Figure 2A:
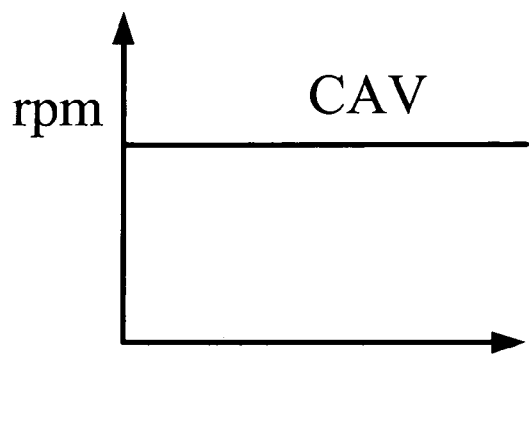
FIG. 2(a) shows a schematic diagram of the radius (r) and the angular speed (rpm) of the CAV motor.
Figure 2B:
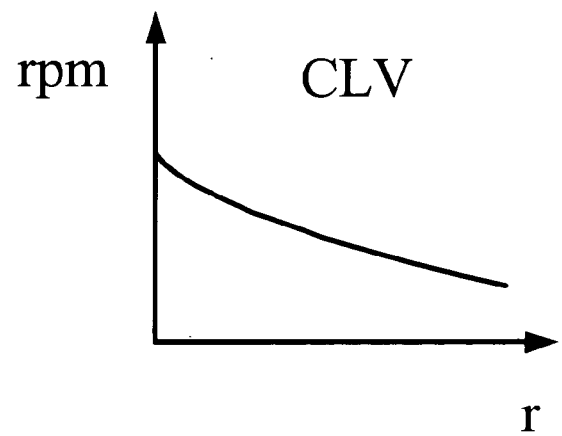
FIG. 2(b) shows a schematic diagram of the radius (r) and the angular speed (rpm) of the CLV motor.
Figure 2C:
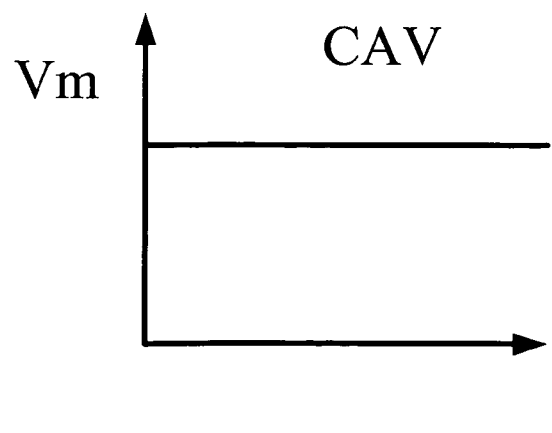
FIG. 2(c) shows a schematic diagram of the radius (r) and the control voltage (Vm) of the CAV motor.
Figure 2D:
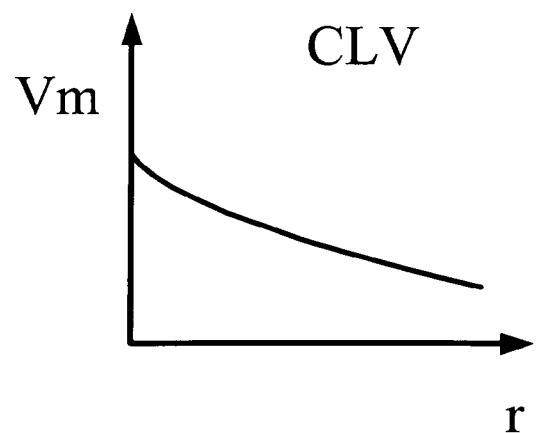
FIG. 2(d) shows a schematic diagram of the radius (r) and the control voltage (Vm) of the CLV motor.
Figure 3:
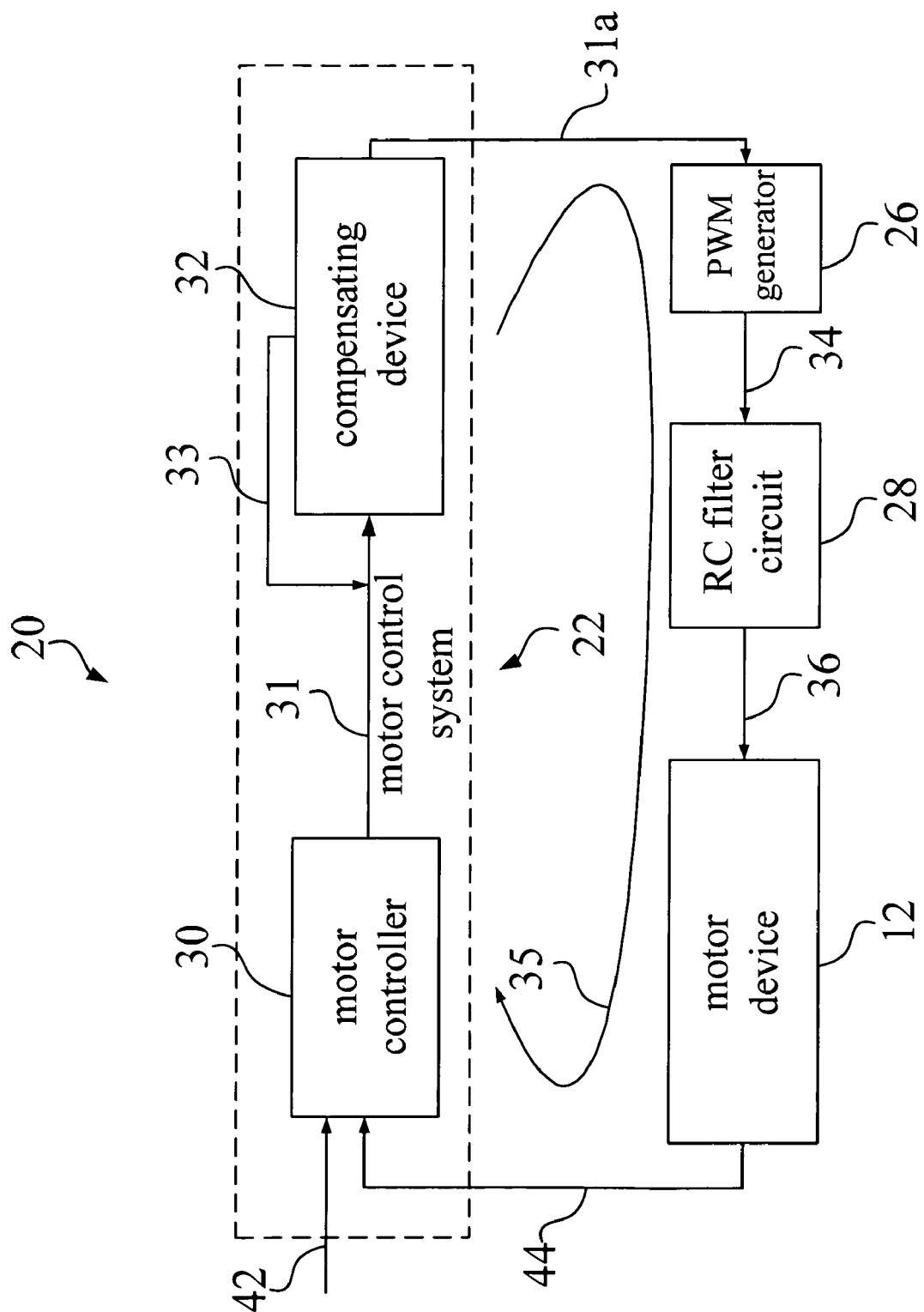
FIG. 3 shows a schematic diagram of a motor control system in a motor system according to the present invention.

Please refer to FIG. 3. FIG. 3 shows a schematic diagram of a motor control system 22 in a motor system 20 according to the present invention. According to one embodiment of the present invention, the motor system 20 comprises a motor device 12, a motor control system 22, a PWM generator 26, and an RC filter circuit 28 for forming a first feedback path 35. The motor control system 22 of the present invention comprises a motor controller 30 and a compensating device 32. As mentioned in the above description, the control signal output generated by the motor control system 22 passes through the PWM generator 26 and the RC filter circuit 28 to control the motor device 12. The motor controller 30 generates a motor control output 31 to the compensating device 32 according to a reference clock signal 42 and a first signal (or called first feedback signal) 44 from the motor device 12. The compensating device 32 estimates and compensates the motor control output 31 for further controlling the motor device 12 according to the motor control output 31 and a second signal (or called second feedback signal) 33. The PWM generator 26 receives the compensated motor control output 31a outputted by the compensating device 32 to generate a corresponding modulation voltage 34. The RC filter circuit 28 generates a control voltage 36 according to the modulation voltage 34. As shown in FIG. 3, beside the compensating device 32, other devices are essentially the same as the motor system 10 of the prior art in FIG. 1.

Figure 4:
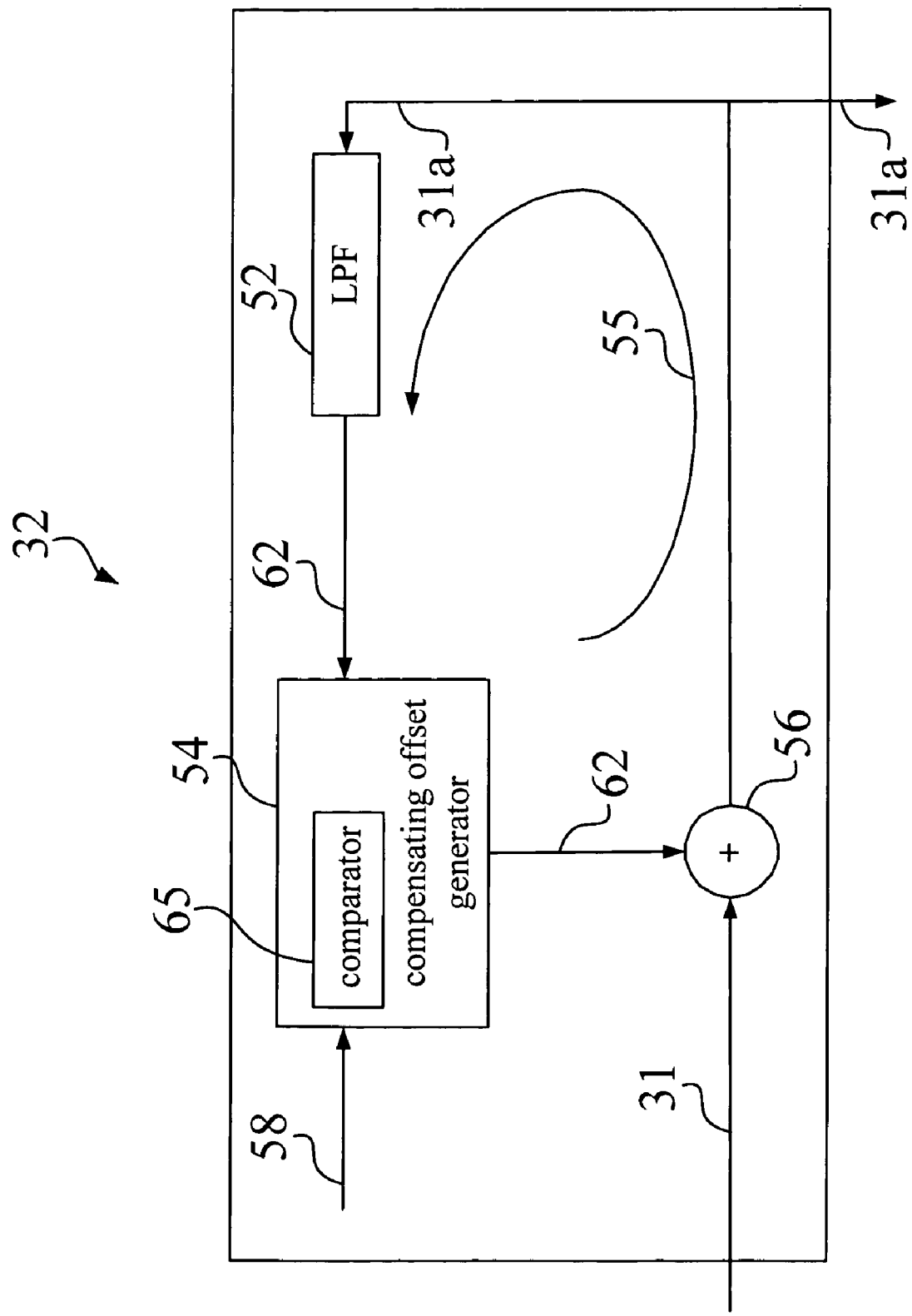
FIG. 4 shows a functional block diagram of the compensating device in FIG. 3.

Please refer to FIG. 4. FIG. 4 shows a functional block diagram of the compensating device 32 in FIG. 3. The compensating device 32 comprises an LPF 52, a compensating offset generator 54, and an adder 56. The LPF is used for averaging and filtering the received motor control outputs 31a from the adder 56 sequentially, so as to obtain a corresponding estimated DC value 62. The compensating offset generator 54 is used for receiving an initial compensating offset 58 and for enabling the outputted estimated compensating offset 60 (i.e. the second feedback signal) to be equal to the initial compensating offset 58 in the beginning. The adder 56 is used for adding up the motor control output 31 transmitted from the motor controller 30 and the estimated compensating offset 60 sequentially to output the corresponding compensated motor control output 31a for further controlling the motor device 12. The compensated motor control output 31a passes through the LPF 52 to obtain the corresponding estimated DC value 62. Then, the corresponding estimated DC value 62 passes through the compensating offset generator 54 to generate the estimated compensating offset 60, i.e. the second feedback signal. Accordingly, a second feedback path 55 is formed.

As shown in FIG. 4, the compensating offset generator 54 comprises a comparator 65 for comparing the estimated DC values (DCs) 62 from the LPF 52 with the current estimated compensating offset (CP) 60. When the current estimated compensating offset 60 is larger than the estimated DC value 62 by a predetermined acceptable range (Ta), i.e. (CP−DCs)>Ta, the estimated compensating offset 60 generated by the compensating offset generator 54 is then adaptively reduced; otherwise, i.e. (CP−DCs)<Ta, the estimated compensating offset 60 generated by the compensating offset generator 54 is then adaptively increased. The range for increasing or reducing is dependent on the degree of convergence. If the estimated compensating offset 60 is close to the estimated DC value 62, the range for increasing or reducing is smaller, so that the estimated compensating offset 60 can converge to the estimated DC value 62 at the end.

The motor control system 22 of the present invention utilizes the second feedback path 55 of the compensating device 32 to form the second feedback signal 60 for estimating and compensating the motor control output 31, so as to reduce the steady-state phase error. The detailed principle is described in the following.

Figure 5A:
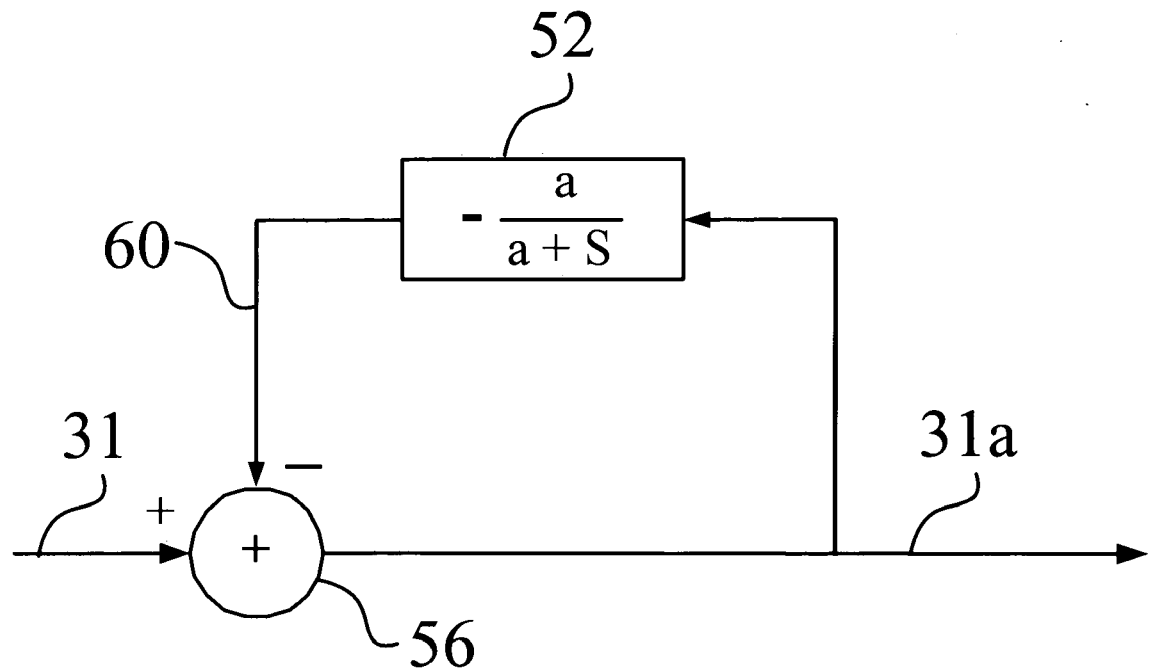
FIG. 5(a) shows a schematic diagram of the Laplace transfer function of the circuits on the second feedback path in steady state.
Figure 5B:
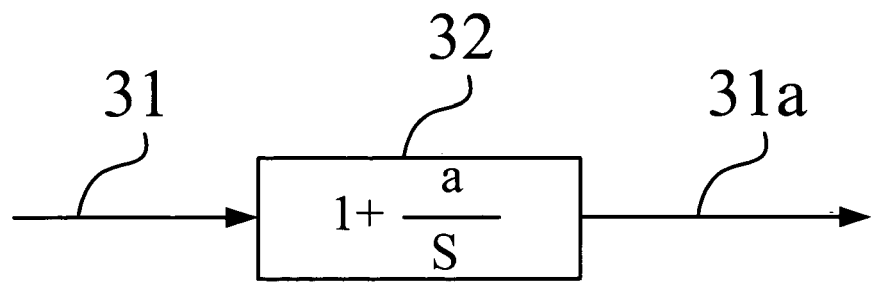
FIG. 5(b) shows a schematic diagram of an equivalent circuit in FIG. 5(a).
Figure 5C:
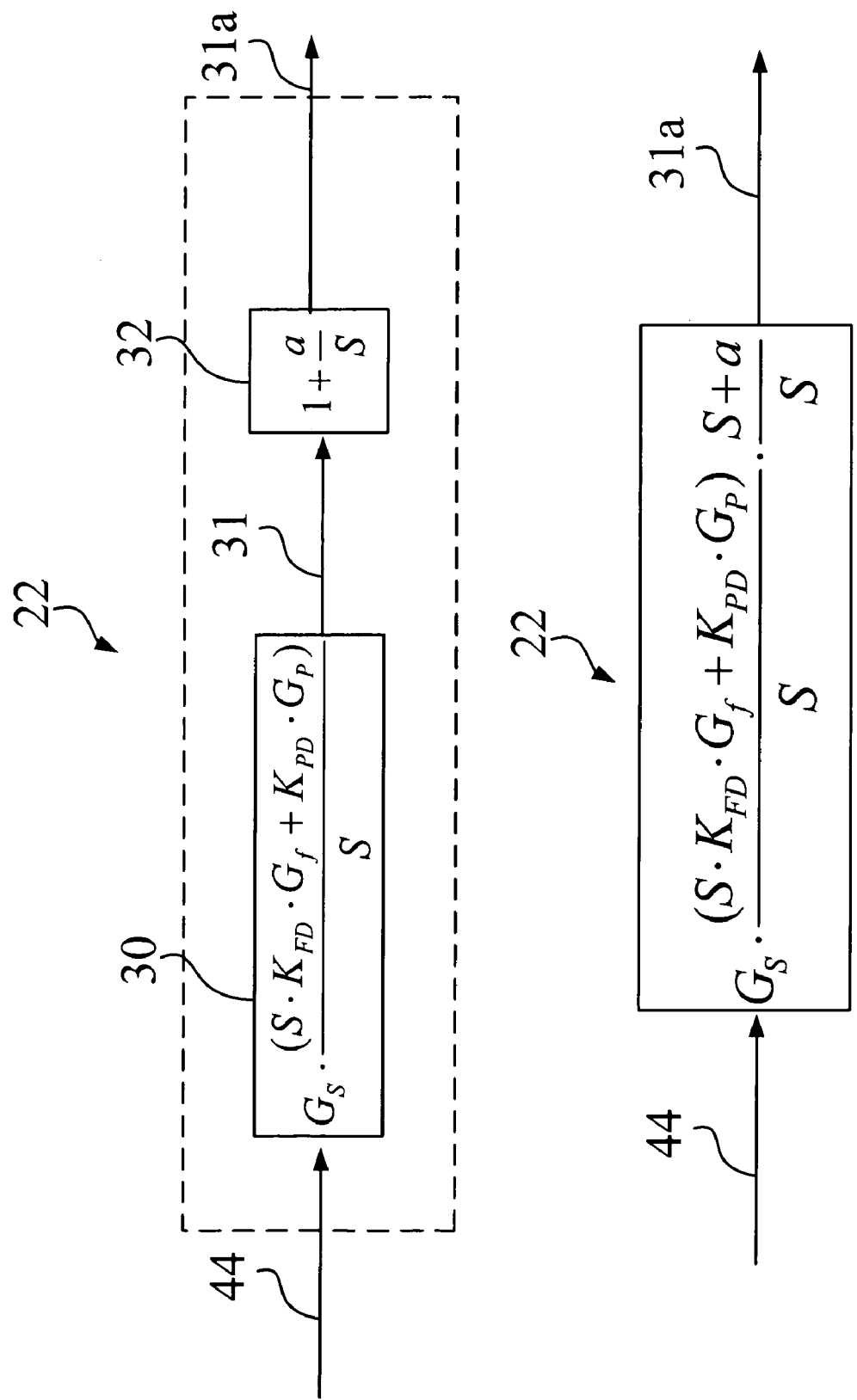
FIG. 5(c) shows a schematic diagram of the transfer function of the motor control system according to the present invention.

Please refer to FIG. 5(*a*) to FIG. 5(*c*). FIG. 5(*a*) shows a schematic diagram of the Laplace transfer function of the circuits on the second feedback path 55 in steady state. FIG. 5(*b*) shows a schematic diagram of an equivalent circuit in FIG. 5(*a*). FIG. 5(*c*) shows a schematic diagram of the transfer function of the motor control system according to the present invention. About the principle of the present invention, please refer to FIG. 5(*a*). FIG. 5(*a*) shows a schematic diagram of the circuits on the second feedback path 55 in FIG. 4. The second feedback signal 60 is a feedback signal of the compensated motor control output 31 passing through the LPF 52. For a first order LPF, $$\frac{a}{a+S}$$

is the Laplace transfer equation of the first order LPF 52, wherein a represents a constant, and the value of a will affect the cut-off frequency of the LPF 52; S represents the Laplace variable of the frequency.

FIG. 5(*b*) shows a schematic diagram of the equivalent circuit in FIG. 5(*a*). The circuits on the second feedback path 55 in FIG. 5(*a*) can be further simplified as the equivalent circuit, i.e. the transfer function $$1+\frac{a}{S}$$

can be used to represent the compensating device 32. The motor control output 31 is transferred by the transfer function to output the compensated motor control output 31*a*. Accordingly, the phase error can be eliminated by the compensating device 32. The motor controller 30 and the compensating device 32 in the motor control system 22 of the present invention can be represented by the transfer functions respectively, as shown in FIG. 5(*c*). Furthermore, the integrated transfer function $$G_s \cdot \left( \frac{(S \cdot K_{FD} \cdot G_f + K_{PD} \cdot G_p)}{S} \right) \cdot \frac{(a+S)}{S}$$

is formed by adding up the motor controller 30 and the compensating device 32.

Figure 6A:
FIG. 6(a) shows the convergence result of the estimated DC values (DCs) while the initial compensating offset I1 is close to the steady state.
Figure 6B:
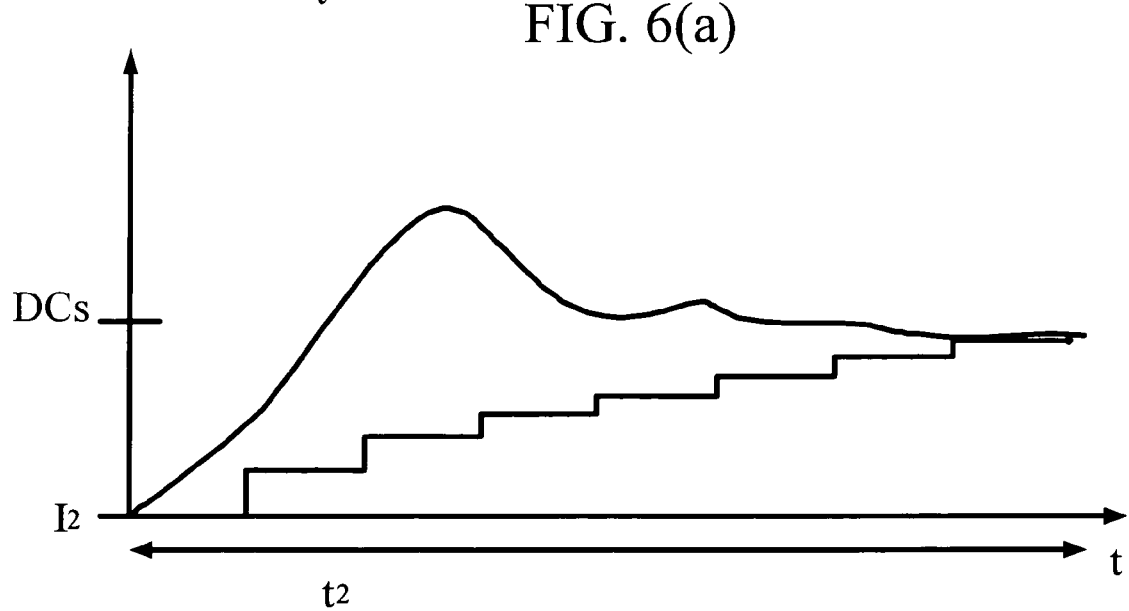
FIG. 6(b) shows the convergence result of the estimated DC values (DCs) while the initial compensating offset I2 is far away from the steady state.

About the reduction of transition time in the present invention, please refer to FIG. 6(*a*) and FIG. 6(*b*). FIG. 6(*a*) shows the convergence result of the estimated DC values (DCs) while the initial compensating offset I1 is close to the steady state. FIG. 6(*b*) shows the convergence result of the estimated DC values (DCs) while the initial compensating offset I2 is far away from the steady state. As shown in FIG. 6(*a*), if the initial compensating offset I1 is set to be close to the estimated DC values (DCs) in steady state, the motor device 12 can reach the steady state quickly after the time of t1. As in the condition, which is equal to the prior art, shown in FIG. 6(*b*), because the initial compensating offset is not added, i.e. the initial compensating offset I2 is equal to 0, the motor device 12 has to spend the time of t2, which is longer than t1, to reach the steady state. In the other condition, when the initial compensating offset is not equal to 0 but is far away from the estimated DC values (DCs) in steady state, the motor device 12 also spends longer time to reach the steady state. According to the above description, as compared with the motor system of the prior art without the compensating offset generator 54, the motor system 20 of the present invention can enable the motor device 12 to converge to the steady state quickly, so as to reduce the transition time of the motor device 12 effectively.

Figure 7:
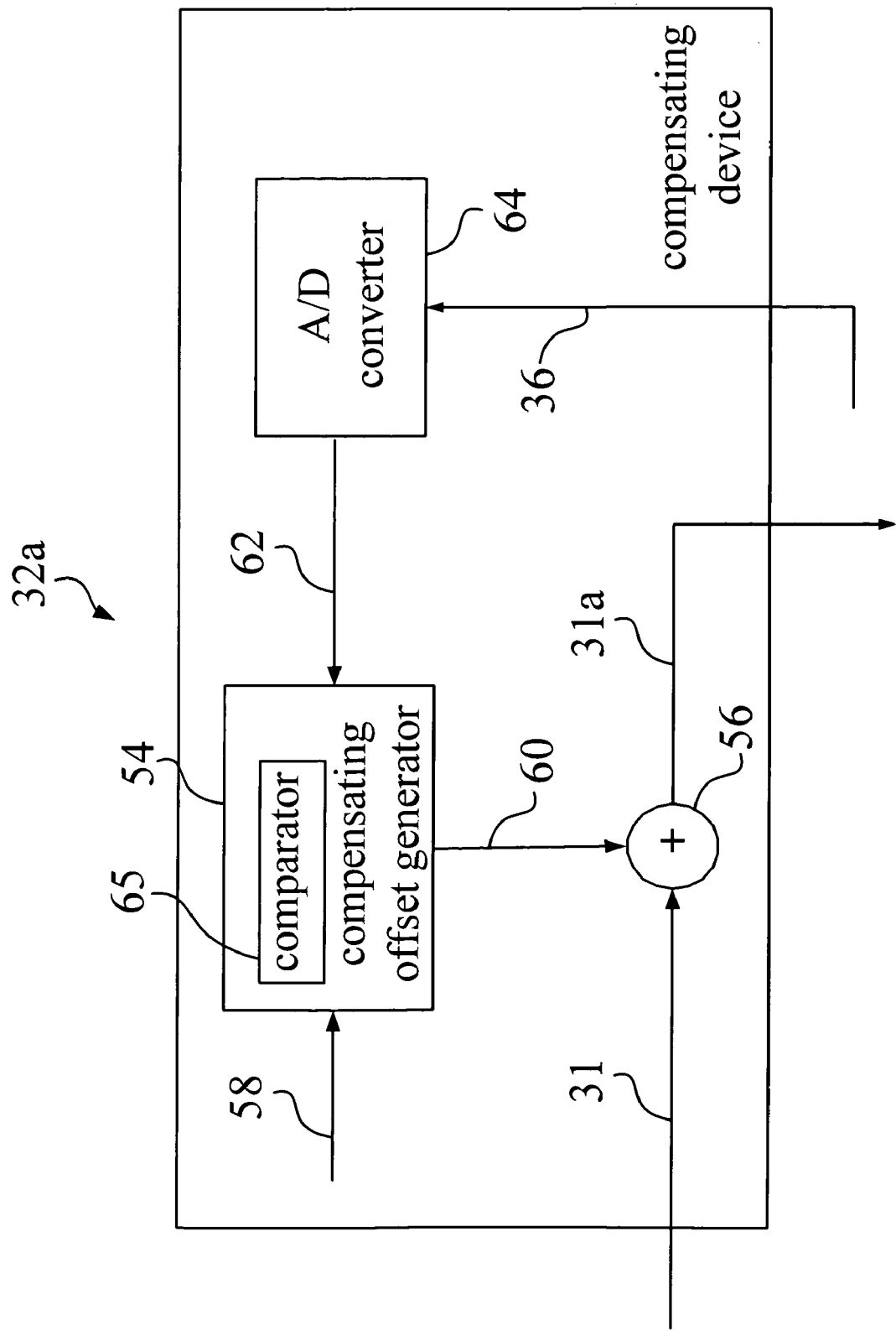
FIG. 7 shows a functional block diagram of the compensating device of another embodiment according to the present invention.

Please refer to FIG. 7. FIG. 7 shows a functional block diagram of the compensating device 32*a* of another embodiment according to the present invention. In this embodiment, the compensating device 32*a* comprises an analog to digital (A/D) converter 64 for receiving and converting the control voltage 36 outputted by the RC filter circuit 28, so as to generate the corresponding estimated DC value 62. Because the function formed by adding up the RC filter circuit 28 and the A/D converter 64 is similar to the LPF 52 of the embodiment in FIG. 4, it may also achieve the same result. The other elements and functions of the compensating device 32*a* are similar to the compensating device 32 in FIG. 4, so they will not be described again.

Figure 8:
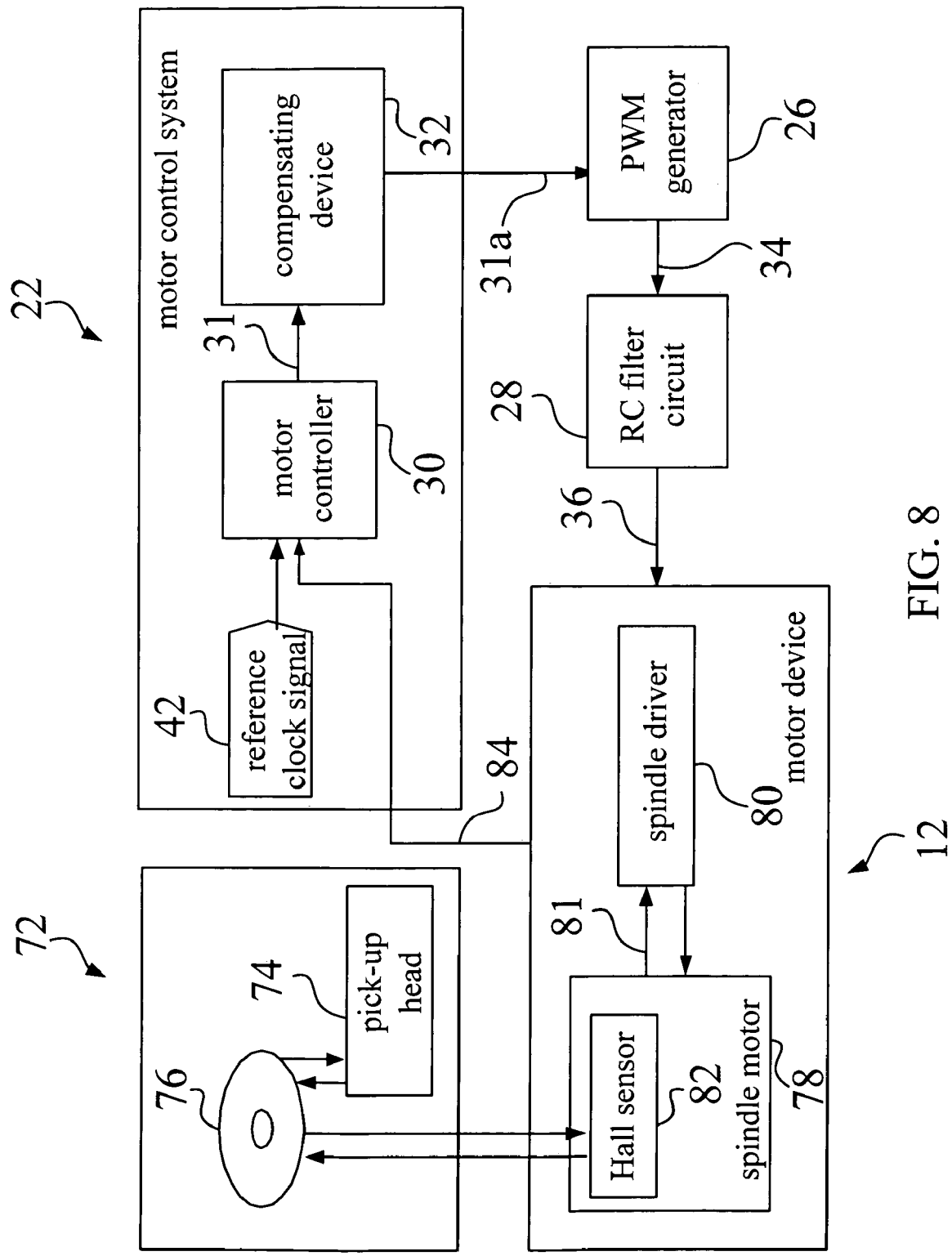
FIG. 8 shows a schematic diagram of the motor control system and the motor device for being used in an optical information recording/reproducing system as a CAV system according to the present invention.

Please refer to FIG. 8. FIG. 8 shows a schematic diagram of the motor control system 22 and the motor device 12 for being used in an optical information recording/reproducing system 72 of a CAV system according to the present invention. The optical information recording/reproducing system 72 is a CAV system. In this embodiment, the optical information recording/reproducing system 72 comprises a pick-up head 74 for reading/storing data from/in an optical recording medium. The motor device 12 comprises a spindle driver 80 and a spindle motor 78. The spindle driver 80 is used for driving the spindle motor 78 according to a control voltage 36. The spindle motor 78 is used for rotating the optical recording medium 76. The spindle motor 78 comprises a Hall sensor 82. A sensing signal 81 generated by the Hall sensor 82 is synthesized by the spindle driver 80 to form a frequency generator (FG) signal 84 to represent the current angular speed of the spindle motor 78. In this embodiment, the FG signal 84 is used as the previously described first feedback signal 44. The motor controller 30 generates the motor control output 31 according to the reference clock signal 42 and the FG signal 84.

Figure 9:
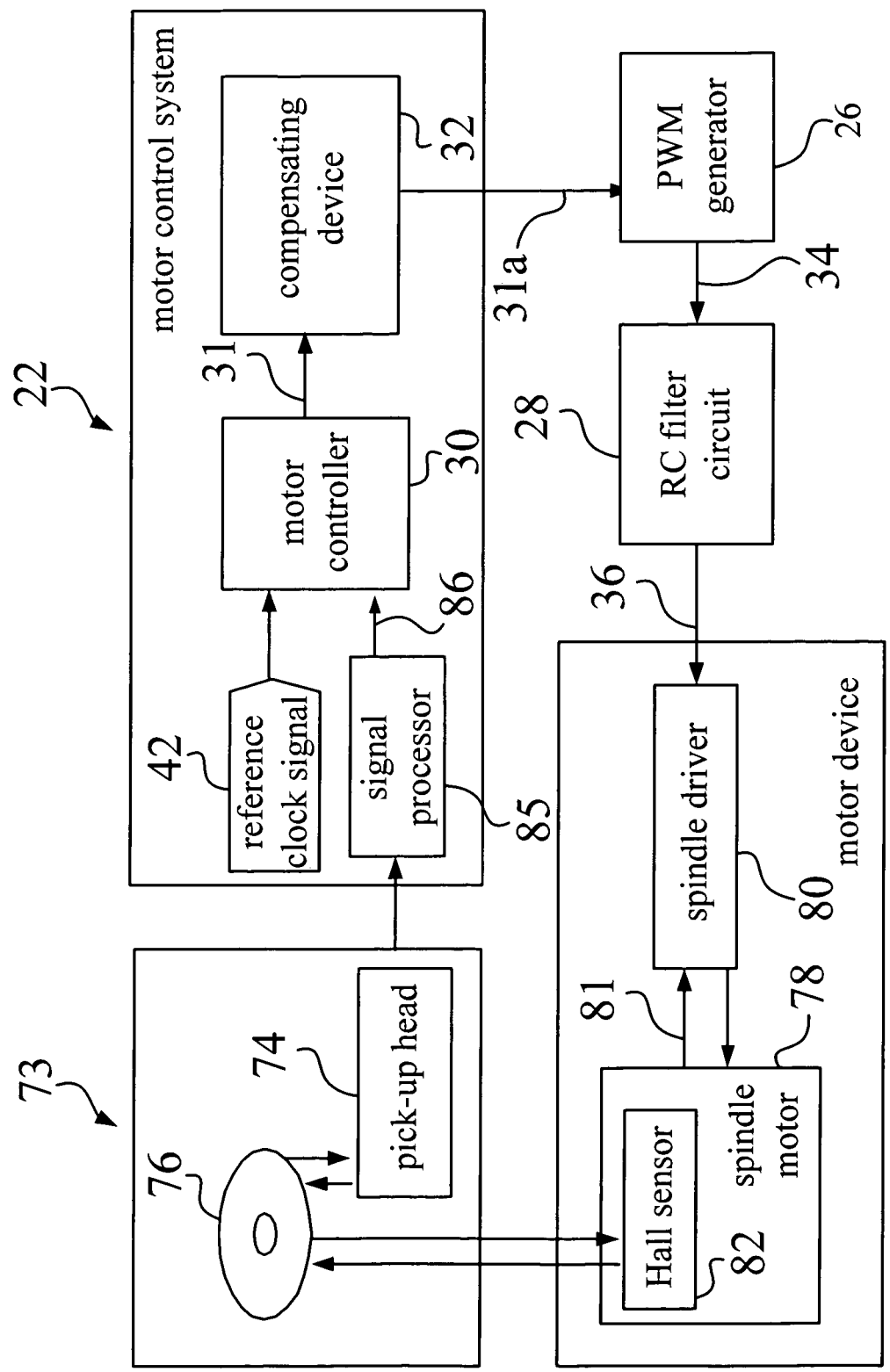
FIG. 9 shows a schematic diagram of the motor control system and the motor device for being used in another optical information recording/reproducing system as a CLV system according to the present invention.

Please refer to FIG. 9. FIG. 9 shows a schematic diagram of the motor control system 22 and the motor device 12 for being used in another optical information recording/reproducing system 73 as a CLV system according to the present invention. The optical information recording/reproducing system 73 is a CLV system. In this embodiment, when the optical information recording/reproducing system 73 drives the optical recording medium 76 to rotate, the pick-up head 74 reads data from the optical recording medium 76. After a signal processor 85 processes, synthesizes, and determines these data, the line speed and angular speed of the location, where the data is being read currently, on the optical recording medium 76 is obtained. If necessary, the current angular speed of the spindle motor 78 can also be calculated according to these data. A first feedback signal 86 generated by the signal processor 85 can be transmitted to the motor controller 30. The motor controller 30 generates the motor control output 31 according to the reference clock signal 42 and the first feedback signal 86. The other parts have been described previously, so they will not be described again.

Figure 10A:
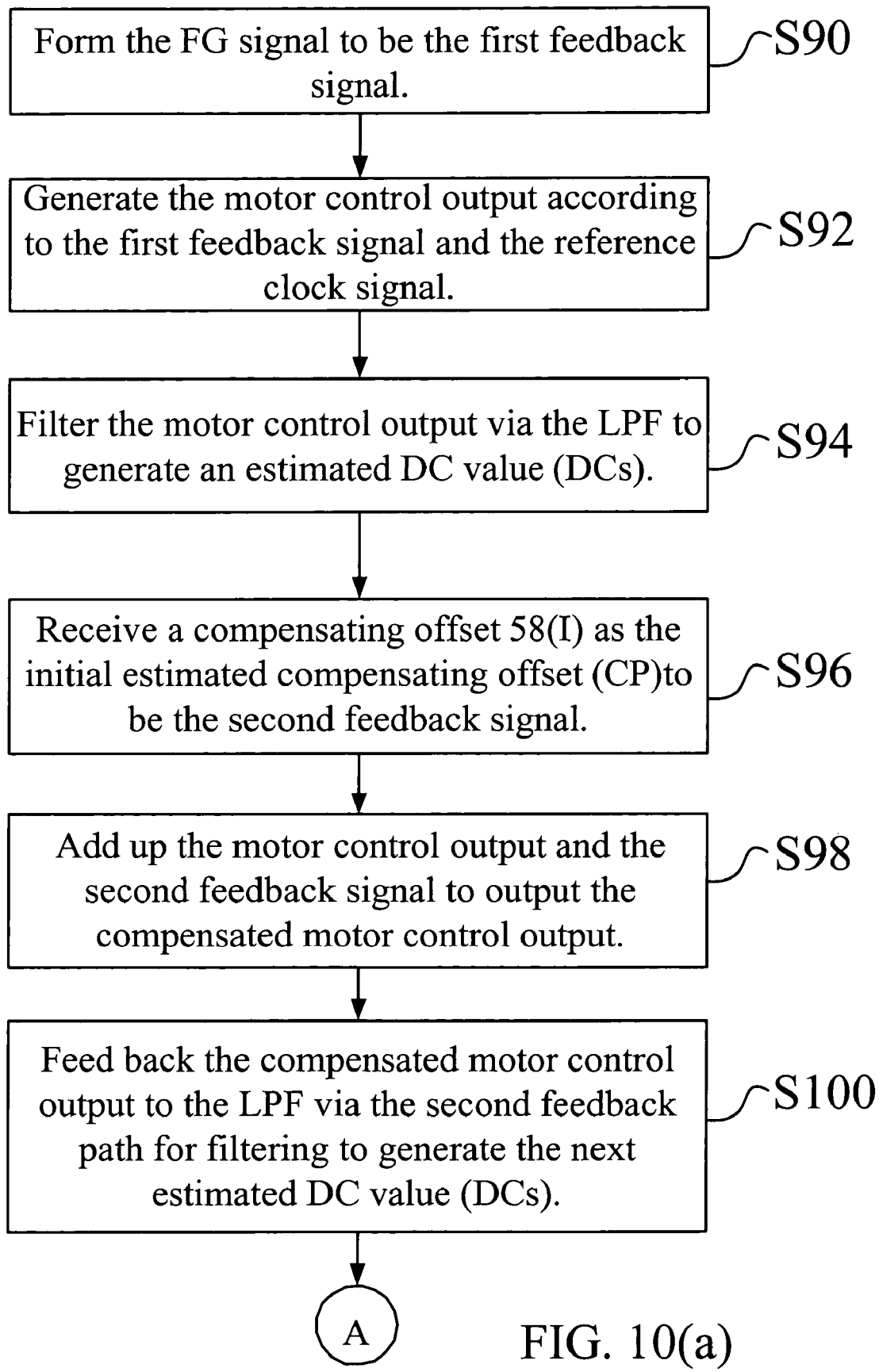
FIG. 10 shows a flowchart of the motor control method according to the present invention.
Figure 10B:
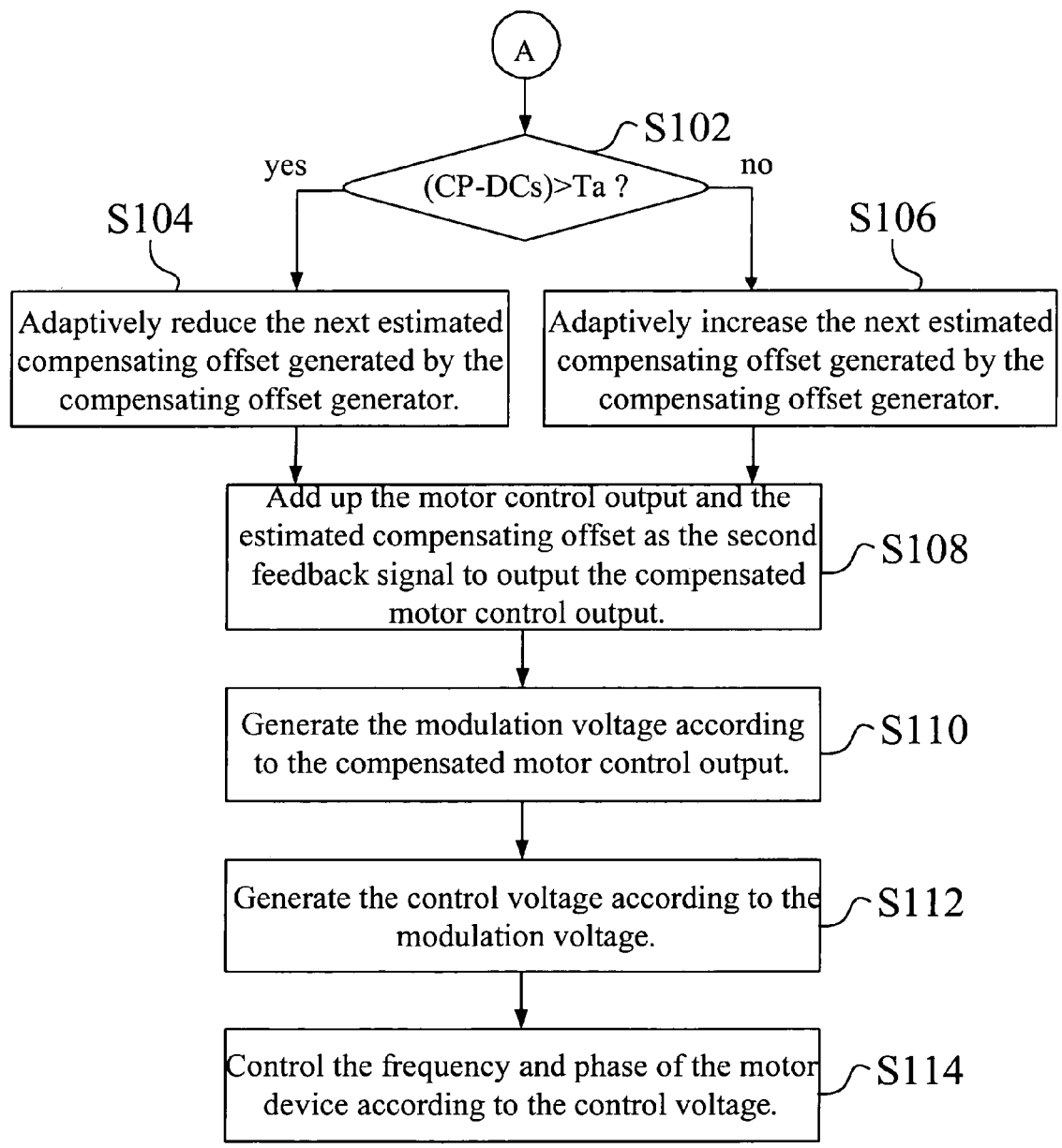

Please refer to FIG. 10(*a*) and FIG. 10(*b*). FIG. 10(*a*) and FIG. 10(*b*) are flowcharts of the motor control method according to the present invention. In another embodiment, the present invention provides a motor control method for generating a motor control output to control the motor device 12. The motor system 22 and the optical information recording/reproducing system 72 shown in FIG. 3, FIG. 4, and FIG. 8 are utilized simultaneously for describing the motor control method of the present invention in detail. The motor control method of the present invention comprises the following steps:

Step S90: Receive and synthesize the sensing signal 81 from the spindle motor 78 by the spindle driver 80 to form the FG signal 84 to be the first feedback signal 44.

Step S92: Generate the motor control output 31 according to the first feedback signal 44 and the reference clock signal 42.

Step S94: Filter the motor control output 31 via the LPF 52 to generate an estimated DC value (DCs) 62.

Step S96: Receive a compensating offset 58(I) as the initial estimated compensating offset (CP) 60 to be the second feedback signal.

Step S98: Add up the motor control output 31 and the second feedback signal 60 to output the compensated motor control output 31a.

Step S100: Feed back the compensated motor control output 31a to the LPF 52 via the second feedback path 55 for filtering, so as to generate the next estimated DC value (DCs) 62.

Step S102: Compare the estimated DC value (DCs) 62 with the current estimated compensating offset (CP) 60 generated by the compensating offset generator 54 to judge whether the condition (CP−DCs)>Ta is established. If yes, go to step S104; otherwise, go to step S106.

Step S104: Adaptively reduce the next estimated compensating offset (CP) 60 generated by the compensating offset generator 54, and go to step S108.

Step S106: Adaptively increase the next estimated compensating offset (CP) 60 generated by the compensating offset generator 54.

Step S108: Add up the motor control output 31 and the estimated compensating offset (CP) 60 as the second feedback signal to output the compensated motor control output 31a, and go to step S100 and step S110.

Step S10: Generate the modulation voltage 34 according to the compensated motor control output 31a.

Step S112: Generate the control voltage 36 according to the modulation voltage 34.

Step S114: Control the frequency and phase of the motor device 12 according to the control voltage 36.

The motor control system 22 of the present invention controls the motor device 12 according to the above steps of the motor control method. In order to reduce the transition time in the beginning, the motor control system 22, especially in step S96, receives the initial compensating offset I1 to be the compensating offset 58(I) as shown in FIG. 6(a). When the motor control system 22 controls the motor device 12 continually, and after the judgment of (CP−DCs)>Ta in step S102 is completed, the value of (CP−DCs) can be used for determining whether the next estimated compensating offset (CP) 60 should be adaptively reduced or increased. In other words, the value of (CP−DCs) is related to the compensating offset 58(I) in step S96. If (CP−DCs)>Ta is established in step S102, the current estimated compensating offset (CP) 60 is too large, and the compensating offset 58(I) has to be set to a smaller or negative value; otherwise, the current estimated compensating offset (CP) 60 is too small, and the compensating offset 58(I) has to be adaptively increased. As to the practical value of the compensating offset 58(I), it can be determined by the value of (CP−DCs). This is how the compensating offset generator 54 in the motor control system 22 of the present invention adaptively reduces or increases the estimated compensating offset (CP) 60.

When the motor control system 22 controls the motor device 12 continually, the control procedure from step S90 to step S114 and back to step S90 will be repeated continually until the motor device reaches steady state or the motor system 20 stops.

When the motor control method of the present invention is used in the optical information recording/reproducing system 73 of a CLV system, except the first feedback signal is the signal 86 obtained via the signal processor while the pick-up head reads data from the optical recording medium, the other steps are the same with the related steps shown in FIG. 10, and they will not be described again.

As compared with the motor control system of the prior art, the motor control system and method thereof of the present invention adds the compensating device 32 and utilizes the second feedback path 55 therein to generate the second feedback signal to judge whether (CP−DCs)>Ta is established for the motor control output, so as to perform the compensation according to the estimated result. Therefore, the steady-state phase error between the first feedback signal 44 and the reference signal 42 can be reduced. About the above result, a person, who knows the motor control theory well, can test and verify its reliability by deriving the transfer function shown in FIG. 5. Moreover, the compensating device 32 of one embodiment according to the present invention can further add the appropriate compensating offset 58(I) to the compensating offset generator 54 selectively. The called compensating offset 58(I) comprises the initial compensating offset I1 of the motor control system 22 in the beginning or the needed compensating offset for adaptively reducing or increasing the estimated compensating offset (CP) 60 later. Accordingly, the estimated compensating offset 60 generated by the compensating device 32 can speed up the spindle motor 78 to reach steady state, i.e. the transition time is reduced, so that the shortcoming of the motor system of the prior art is improved a lot.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A motor control system comprising:
   a motor controller for generating a motor control output according to a reference signal and a first signal;
   a compensating device including:
      a low pass filter (LPF) for averaging and filtering the motor control ouputs sequentially, so as to obtain a corresponding estimated DC value;
      a compensating offset generator for receiving an initial compensating offset and for sequentially generating a corresponding estimated compensating offset to be a second signal according to the estimated DC value; and
      an adder for adding up the motor control output and the estimated compensating offset sequentially to output a corresponding motor control output for further controlling the motor device;
   wherein the low pass filter, the compensating offset generator, and the adder are situated on a second feedback path, and the second signal generated by the compensating offset generator compensates the motor control output received by the compensating device via the second feedback path, so as to obtain the corresponding compensated motor control output; and wherein the compensating device utilizes the compensated motor control output to reduce a steady-state phase error between the first signal and the reference signal.

2. The motor control system of claim 1, wherein the first signal is outputted from a motor device; the motor controller, the compensating device, and the motor device are situated on a first feedback path, and the motor control system transmits the compensated motor control output to the motor device via the first feedback path, so as to control the motor device.

3. The motor control system of claim 1, wherein the compensating offset generator comprises a comparator for comparing the estimated DC value from the low pass filter with the current estimated compensating offset, and when the estimated compensating offset is larger than the estimated DC value by a predetermined acceptable range, the estimated compensating offset generated by the compensating offset generator is then adaptively reduced, otherwise the estimated compensating offset generated by the compensating offset generator is then adaptively increased, so that the estimated compensating offset is converged to the estimated DC value.

4. The motor control system of claim 1, wherein by appropriately setting the initial compensating offset, the estimated compensating offset generated by the compensating offset generator is accelerated to converge to the estimated DC value in steady state, so as to speed up the system reaction and to reduce the transition time.

5. The motor control system of claim 1, wherein the compensating device is connected to a pulse width modulation (PWM) generator for receiving the compensated motor control output outputted by the compensating device to generate a corresponding modulation voltage, the modulation voltage further enters an RC filter circuit to generate a control voltage, and the compensating device further comprises an analog to digital (A/D) converter for receiving and converting the control voltage outputted by the RC filter circuit, so as to generate the corresponding estimated DC value.

6. The motor control system of claim 1, wherein the motor device and the motor control system are employed in an optical information recording/reproducing system, the optical information recording/reproducing system comprises a pick-up head for reading/storing data from/on an optical recording medium, and the motor device further comprises:

a spindle motor for rotating the optical recording medium; and a spindle driver for driving the spindle motor according to a control voltage.

7. The motor control system of claim 6, wherein the spindle motor comprises a sensor, and a signal generated by the sensor is synthesized by the spindle driver to form a frequency generator (FG) signal to represent the current angular speed of the spindle motor.

8. The motor control system of claim 7, wherein when the optical information recording/reproducing system is a constant linear velocity (CLV) system, the first signal is a signal obtained while the pick-up head reads data from the optical recording medium.

9. The motor control system of claim 7, wherein when the optical information recording/reproducing system is a constant angular velocity (CAV) system, the first signal is the frequency generator signal.

10. The motor control system of claim 1, wherein the reference signal is a reference clock signal, and the motor controller comprises a frequency and phase error compensator for comparing the first signal with the reference clock signal to generate the motor control output to the compensating device.

11. A motor control method comprising the following steps:

generating a motor control output according to a reference signal and a first signal from a motor device;

averaging and filtering the motor control outputs sequentially, so as to obtain a corresponding estimated DC value;

receiving an initial compensating offset for adding to the obtained estimated DC value and sequentially generating a corresponding estimated compensating offset to be a second signal;

adding up the motor control output and the estimated compensating offset sequentially to output a corresponding compensated motor control output for further controlling the motor device; and wherein the compensated motor control output is generated according to the motor control output and the second signal, such that a steady-state phase error between the first signal and the reference signal is reduced.

12. The motor control method of claim 11, wherein the motor control method compares the estimated DC value with the current estimated compensating offset, and when the estimated compensating offset is larger than the estimated DC value by a predetermined acceptable range, the estimated compensating offset is then adaptively reduced, otherwise the estimated compensating offset is then adaptively increased, so that the estimated compensating offset is converged to the estimated DC value finally.

13. The motor control method of claim 11, wherein by appropriately setting the initial compensating offset, the estimated compensating offset is accelerated to converge to the estimated DC value in steady state, so as to speed up the system reaction and to reduce the transition time.

14. The motor control method of claim 11, wherein the motor control method utilizes a pulse width modulation (PWM) generator for receiving the compensated motor control output to generate a corresponding modulation voltage, the modulation voltage further enters an RC filter circuit to generate the control voltage, and the motor control method further utilizes an A/D converter for receiving and converting the control voltage outputted by the RC filter circuit, so as to generate the corresponding estimated DC value.

15. The motor control method of claim 11, wherein the motor device and the motor control system are employed in an optical information recording/reproducing system, the optical information recording/reproducing system comprises a pick-up head for reading/storing data from/on an optical recording medium, and the motor device further comprises:

a spindle motor for rotating the optical recording medium; and a spindle driver for driving the spindle motor according to a control voltage.

16. The motor control method of claim 15, wherein the spindle motor comprises a sensor, and a signal generated by the sensor is synthesized by the spindle driver to form a frequency generator (FG) signal to represent the current angular speed of the spindle motor.

17. The motor control method of claim 16, wherein when the optical information recording/reproducing system is a constant liner velocity (CLV) system, the first signal is a signal obtained while the pick-up head reads data from the optical recording medium.

18. The motor control method of claim 11, wherein the reference signal is a reference clock signal, and the motor control method further utilizes a frequency and phase error compensator for comparing the first signal with the reference clock signal to generate the motor control output.

19. The motor control method of claim 16, wherein when the optical information recording/reproducing system is a constant angular velocity (CAV) system, the first signal is the frequency generator signal.

* * * * *